US008938146B2

(12) United States Patent
Lyngsøe et al.

(10) Patent No.: US 8,938,146 B2
(45) Date of Patent: Jan. 20, 2015

(54) HOLLOW CORE FIBER WITH IMPROVEMENTS RELATING TO OPTICAL PROPERTIES AND ITS USE, METHOD OF ITS PRODUCTION AND USE THEREOF

(71) Applicant: NKT Photonics A/S, Birkerød (DK)

(72) Inventors: Jens Kristian Lyngsøe, Hornbæk (DK); Jes Broeng, Birkerød (DK)

(73) Assignee: NKT Photonics A/S, Birkerod (DK)

( * ) Notice: Subject to any disclaimer, the term of this patent is extended or adjusted under 35 U.S.C. 154(b) by 40 days.

(21) Appl. No.: 13/912,872

(22) Filed: Jun. 7, 2013

(65) Prior Publication Data

US 2014/0003778 A1    Jan. 2, 2014

Related U.S. Application Data

(60) Provisional application No. 61/657,411, filed on Jun. 8, 2012.

(51) Int. Cl.
*G02B 6/36* (2006.01)
*G02B 6/02* (2006.01)

(52) U.S. Cl.
CPC ........................................ *G02B 6/02* (2013.01)
USPC ....................................................... 385/127

(58) Field of Classification Search
USPC ........................................................ 385/123
See application file for complete search history.

(56) References Cited

U.S. PATENT DOCUMENTS

| 6,985,661 | B1 | 1/2006 | Russell et al. |
| 7,116,875 | B2 | 10/2006 | Wadsworth et al. |
| 7,321,712 | B2 | 1/2008 | Williams et al. |
| 7,356,233 | B2 | 4/2008 | Fini |
| 7,865,051 | B2 | 1/2011 | Fini |
| 2002/0181911 | A1 | 12/2002 | Wadsworth et al. |
| 2004/0151450 | A1 | 8/2004 | Wadsworth et al. |
| 2005/0118420 | A1 | 6/2005 | Kim et al. |
| 2005/0276556 | A1 | 12/2005 | Williams et al. |
| 2005/0281522 | A1 | 12/2005 | Kim et al. |
| 2007/0189686 | A1* | 8/2007 | Kim et al. ..................... 385/123 |
| 2007/0242923 | A1 | 10/2007 | Fini |
| 2010/0002980 | A1 | 1/2010 | Fini |

FOREIGN PATENT DOCUMENTS

WO    WO 02/088802 A1    11/2002

OTHER PUBLICATIONS

Bjarklev et al., "Fabrication of Photonic Crystal Fibres", Copyright 2003 by Kluwer Academic Publishers, (10 pages).
Lyngsø et al., "Single-Mode 7-Cell Core Hollow Core Photonic Crystal Fiber with Increased Bandwidth", Proc. SPIE, 21st International Conference on Optical Fiber Sensors, (May 17, 2011), vol. 7753, pp. 77533Q-1-77533Q-4.

* cited by examiner

*Primary Examiner* — Uyen-Chau N Le
*Assistant Examiner* — Hoang Tran
(74) *Attorney, Agent, or Firm* — Buchanan Ingersoll & Rooney PC

(57) ABSTRACT

The invention relates to a hollow core optical fiber having light guided in a single-mode in the core.

13 Claims, 12 Drawing Sheets start x50(not to scale)

start x100(not to scale)

start x50 (not to scale)

start x100 start x50 start x100

Type 1 surface mode
Light is confined in the
struts and bridges of the
core wall Type 2 surface mode
Light is confined in one
of the core wall
resonators

US 8,938,146 B2

HOLLOW CORE FIBER WITH IMPROVEMENTS RELATING TO OPTICAL PROPERTIES AND ITS USE, METHOD OF ITS PRODUCTION AND USE THEREOF

This is Application claims the benefit of Non-provisional application No. 61/657,411 filed on Jun. 8, 2012. The disclosure of the Non-provisional application is hereby incorporated by reference herein in its entirety.

The invention relates to an optical fiber structure, a method of its production, a preform for producing it, and use of the optical fiber. The optical fiber may be a Hollow Core (HC) Photonic Crystal Fiber (PCF) comprising a microstructured cladding arranged to provide a Photonic Bandgap (PBG). Photonic Crystal Fibers are also referred to as Microstructured Optical Fibers or Holey Fibers. The PBG may be realized by arranging the microstructured cladding in a manner, whereby it comprises a periodic modulation of the refractive index. In a HC-PCF comprising a PBG, light may be guided in a core having an effective refractive index below the effective refractive index of the surrounding material. The effective refractive index is a function of the signal wavelength and the geometry and material composition of the cladding structure. Microstructured optical fibres or PCFs, and their method of production are known, as for example described in "Photonic crystal fibres" by Bjarklev et al., Kluwer Academic Press and WO02088802 that is incorporated herein by reference. The PBG guiding mechanism is fundamentally different from the total internal reflection guiding mechanism, which is exploited in for example Large Mode Area (LMA) PCFs. In a HC-PCF guiding light by the PBG mechanism, a large fraction of the optical power may be present in the hollow core and in the holes of the cladding, which result in a low power-in-glass fraction (such as less than <5%), which in turn may give rise to a very low non-linear coefficient and low loss due to low intrinsic material absorption. Hollow and solid core PCFs may be fabricated by the stack-and-draw technique, where a large-scale preform is prepared by stacking the elements of the preform, and subsequently drawing the preform to a fiber.

General methods of producing photonic crystal fibers are known from e.g. U.S. Pat. No. 7,321,712, and U.S. Pat. No. 6,985,661.

Various types of hollow core fibers and design for controlling the number of modes within the hollow core are known from e.g. U.S. Pat. Nos. 6,985,661, 7,321,712 and 7,356,233. In particular, hollow core fibers can be configured to support only a fundamental mode in the hollow core at a signal wavelength, see e.g. "Single-mode 7-cell core hollow core photonic crystal fiber with increased bandwidth", Lyngsø, J. K.; Jakobsen, C.; Simonsen, H. R.; Broeng, J., 21st International Conference on Optical Fiber Sensors. Edited by Bock, Wojtek J.; Albert, Jacques; Bao, Xiaoyi. Proceedings of the SPIE, Volume 7753, pp. 77533Q-77533Q-4 (2011).

Various types of hollow core fibers and designs for controlling the polarization state of modes within the core are known from e.g. U.S. Pat. No. 7,865,051.

Hollow core fibers, typically, support one or more modes that are confined to the central, hollow core as well as one or more modes that are confined to the interface between the central core and the cladding. The later types of modes are often referred to as surface modes. Typically the number of modes supported depends on the wavelength of the guided light and in some embodiments the fiber support guiding only for certain wavelengths.

Surface modes are often undesired in applications using hollow core fibers, such as for example gyroscope, optical communications, sensors, lasers. The reason for this is that the surface modes can introduce noise, increase attenuation, change dispersion properties or other undesired effects.

Various designs have been proposed to reduce or eliminate surface modes, see e.g. US 2005/0118420 and US 2005/0281522. These designs are characterized by the core being formed in such a manner that it intersects the crystal lattice of the cladding in certain patterns, such that a mode confined to the central core do not couple to the surface modes. Alternatively, the core surroundings (referred to as core ring) can be designed to reduced the number of surface modes, see e.g. US 2007/0189686.

Various terms, definitions and descriptions of optical properties and parameters for optical fibers are described in U.S. Pat. Nos. 6,985,661, 7,321,712 and 7,356,233, and these terms, definitions and descriptions are incorporated herein by reference, unless defined/stated differently in the present application. These terms, definitions and descriptions includes, but are not limited to, perturbation of the cladding.

A brief description of the drawings is as follows.

Figure 1A:
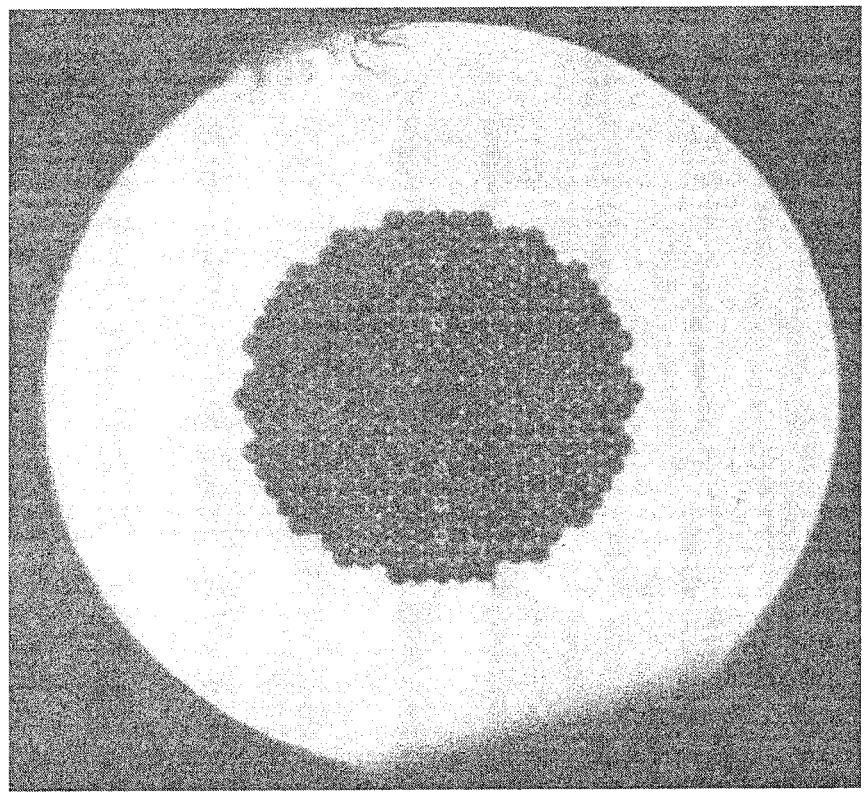
FIGS. 1A through 3B show transverse cross sections of fibers 1 according to the invention.

The inventors of the present invention have realized new designs of hollow core fibers that reduce or eliminate surface modes. In the following the invention will be discussed in relation to features in a transverse cross section of the fiber. A transverse cross section is perpendicular to the longitudinal axis of the fiber along which guided light is arranged to propagate.

The present inventors have realized that surface modes may be suppressed in hollow core fibers by one or more relatively small resonant features in the cladding which act to suppress surface modes. By small feature, in this context, is meant that a resonator has a largest dimension 2.5 times the crystal lattice pitch of the cladding or less, such as 2.3 times or less, such as 2.0 times or less, such as 1.8 times or less, such as 1.6 times or less, such as 1.4 times or less, such as 1.2 times or less, such as 1 times or less, such as 0.8 times or less, such as 0.5 times or less. In one embodiment the largest dimension is preferably comparable to the pitch, such as within 100% or less, such as within 50% or less, such as within 25% or less, such as within 15% or less, such as within 10% or less, such as within 5% or less. Also, a resonator may be defined as a fully collapsed hole. In that case, the resonator may be seen to have a largest dimension equal to zero. The largest dimension is defined as the largest dimension within the resonator hole (i.e. for a circular resonator hole, the largest dimension is identical to the diameter, and for an elliptical holes, the largest dimension is identical to the major axis).

In one embodiment a resonant feature supports guiding for light with a propagation constant which allow efficient coupling of a surface mode supported by the fiber. In one embodiment efficient coupling is taken to mean that the combined resonators provide suppression of surface mode(s) on the order of 1 dB/m or more, such as 3 dB/m or more, such as 10 dB/m or more, such as 20 dB/m or more. These numbers refer to the attenuation of a surface mode measured using, for example a cut-back technique, where surface modes are deliberately excited at an input end of the fiber and transmitted light in the surface mode(s) is measured at the output of the fiber (for different fiber lengths). The cut-back technique is a method well known in the art of optical fiber characterization.

In one embodiment the propagation constant of a resonant feature is within the propagation constant of the surface mode to within 50% or less, such as 40% or less, such as 30% or less such as 20% or less, such as 10% or less, such as 5% or less such as 3% or less, such as 2% or less, such as 1% or less, such as 0.5% or less. In one embodiment two or more features in combination provide the discussed guiding. In this case the features are also referred to as resonant features. A perturbation is formed by one or more resonant feature adjacent to one another. A set of resonant features which provides guiding indicually as well as in combination may be said to form several perturbation regions defined by the individual resonant features as well as one or more regions defined by their combination.

Figure 1B:
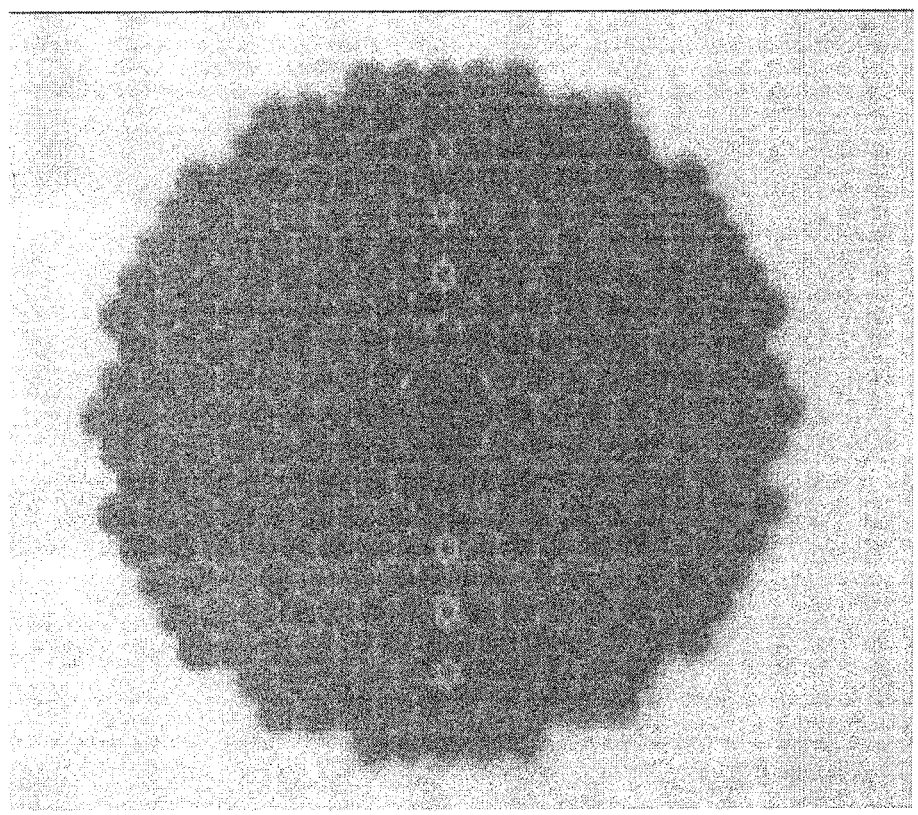
Figure 2A:
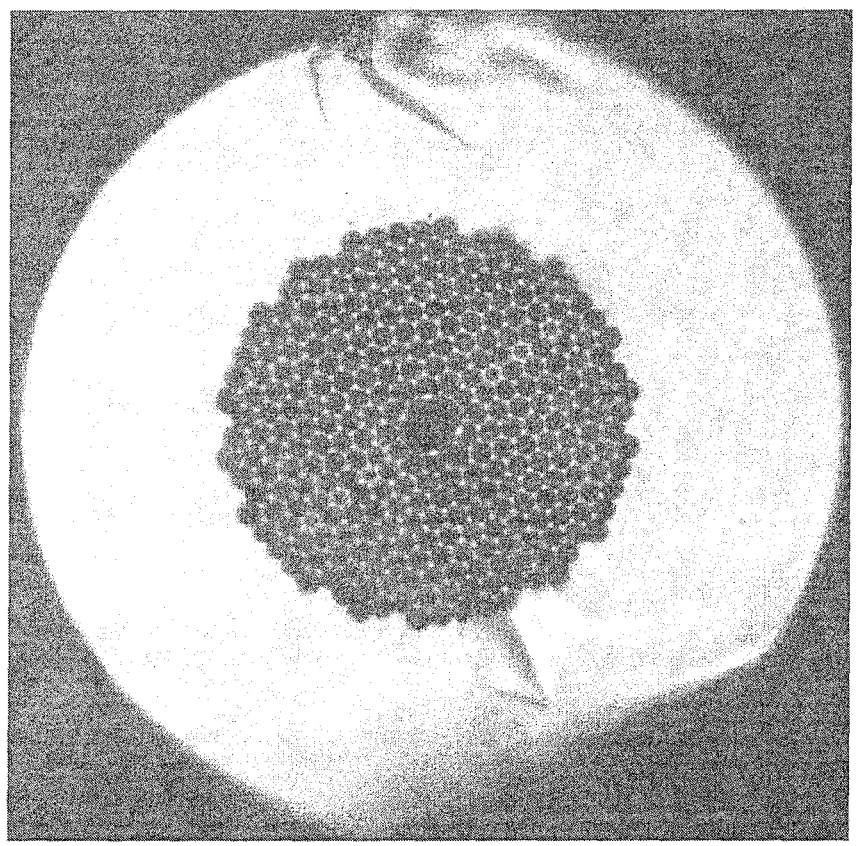
Figure 2B:
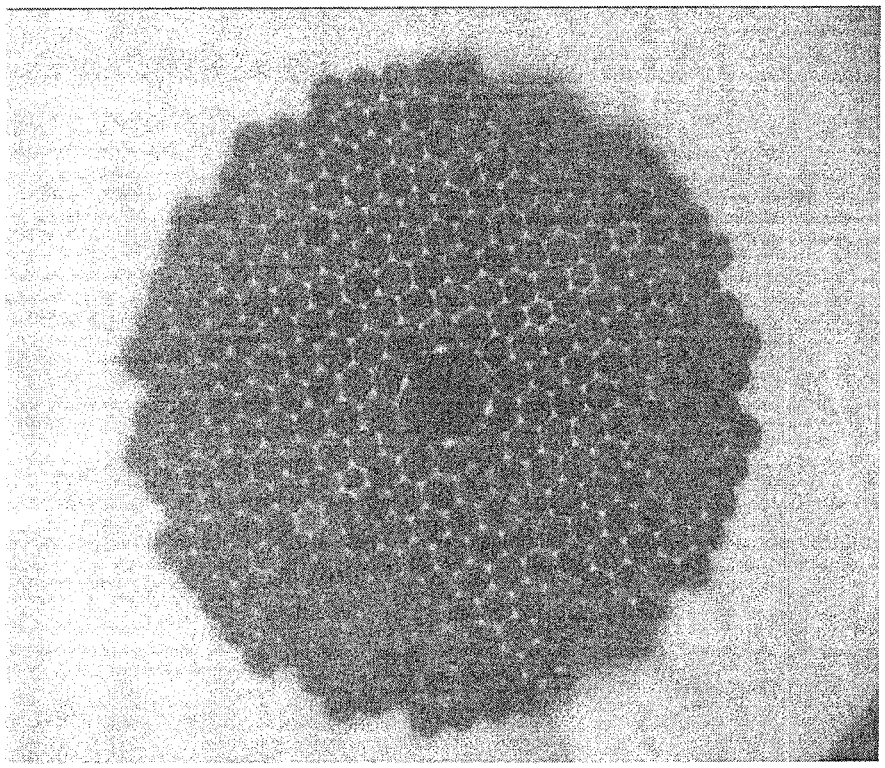
Figure 3A:
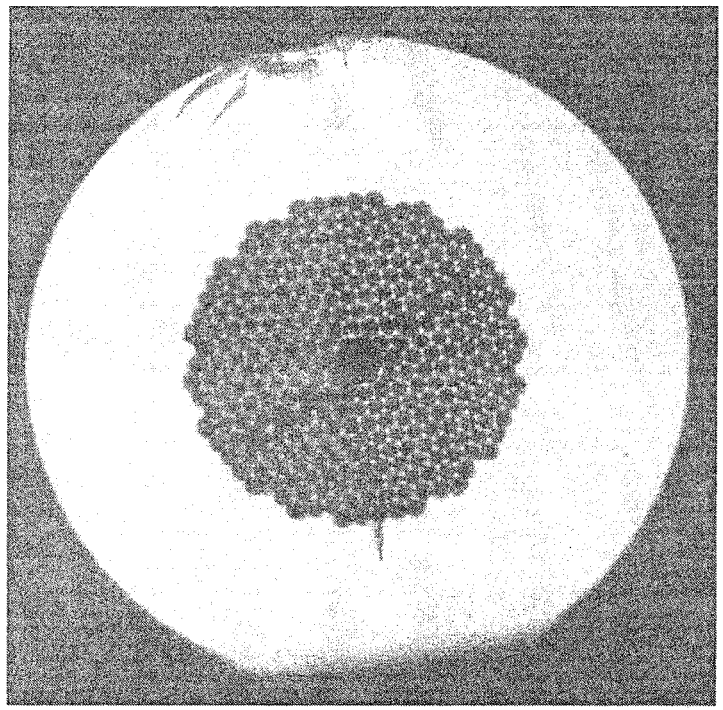
Figure 3B:
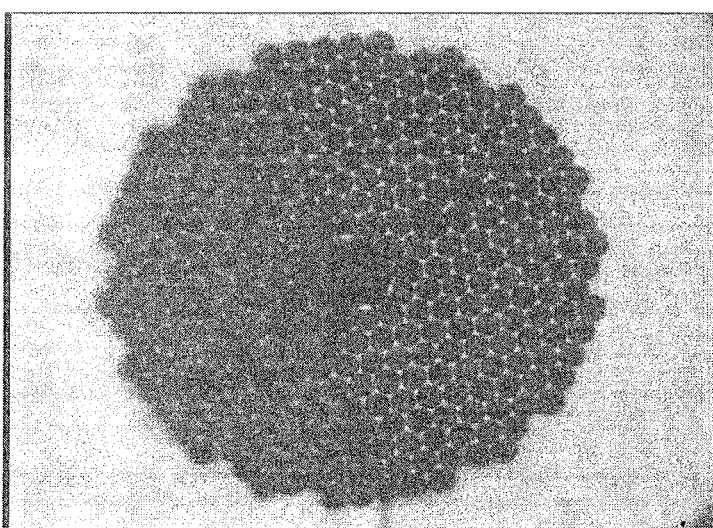
Figure 4:
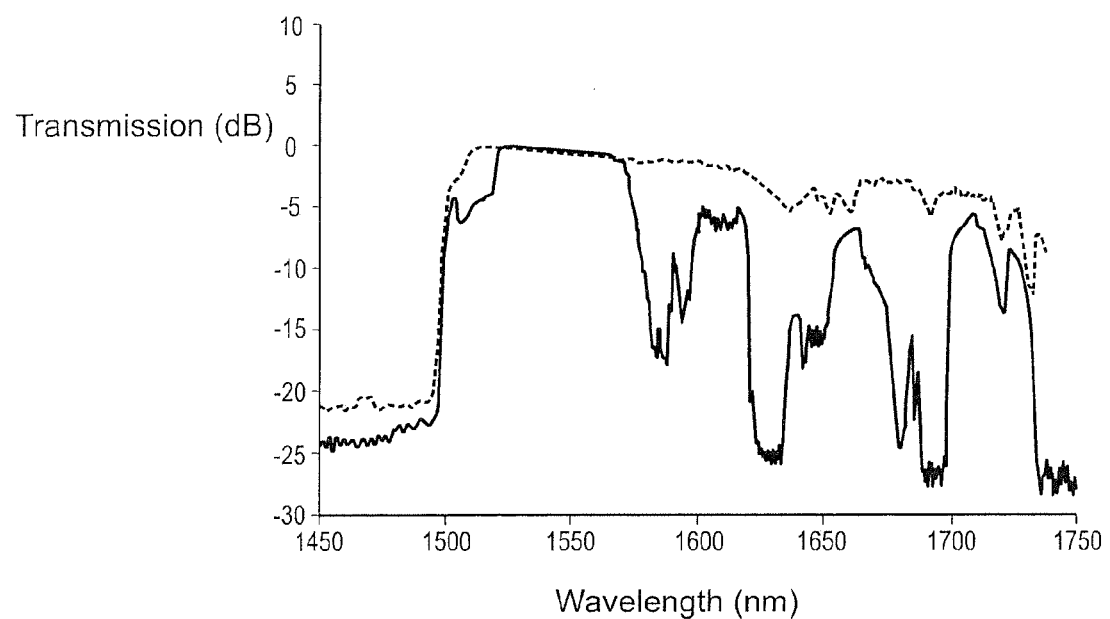
FIGS. 4 and 5 show line graphs and corresponding cross sections of fibers.
Figure 4:
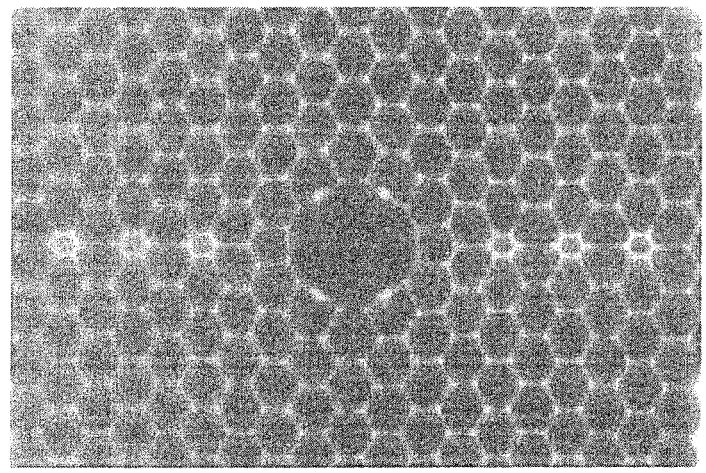
Figure 5:
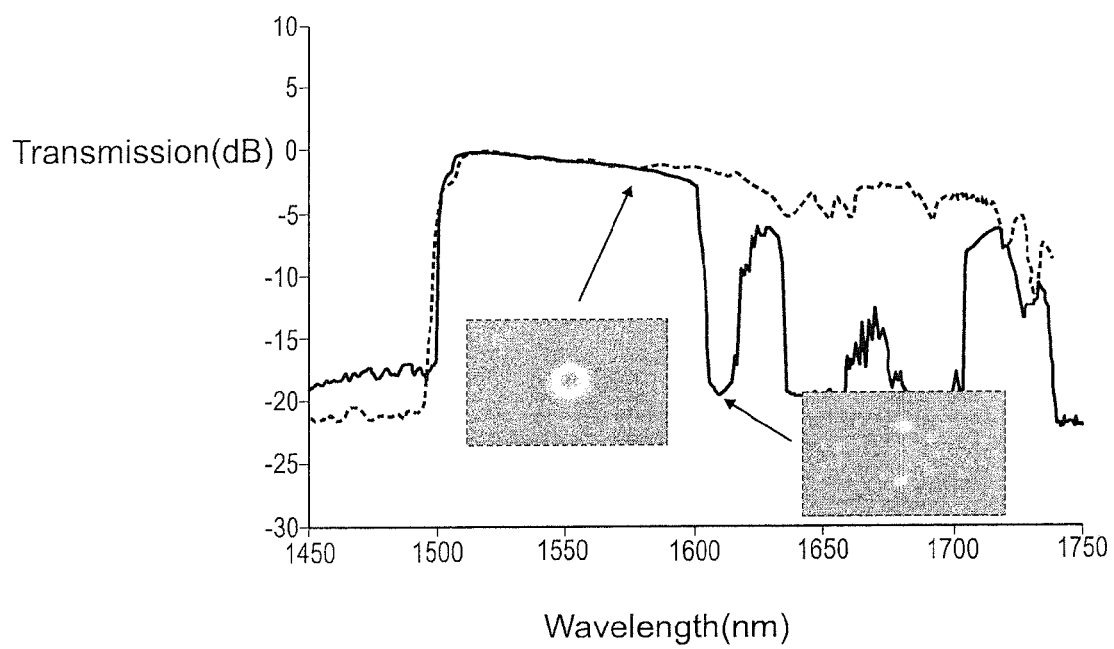
Figure 5:
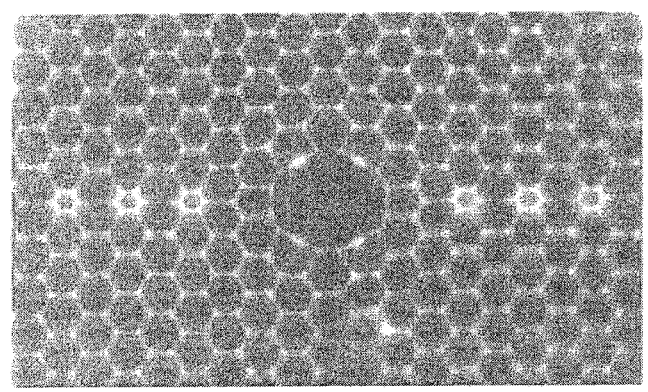
Figure 6:
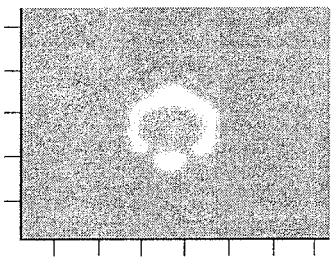
FIGS. 6 and 9 show examples of surface modes—Pull 2.
Figure 6:
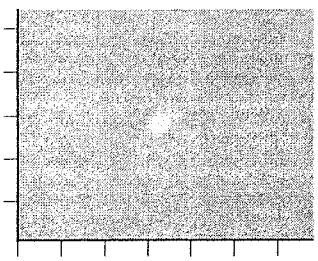
Figure 6:
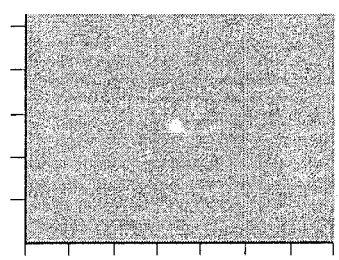
Figure 6:
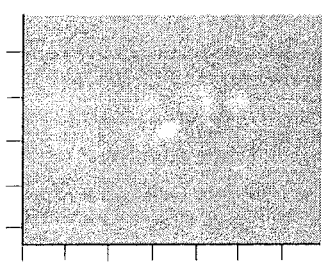
Figure 6:
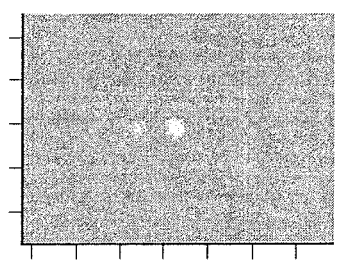
Figure 7:
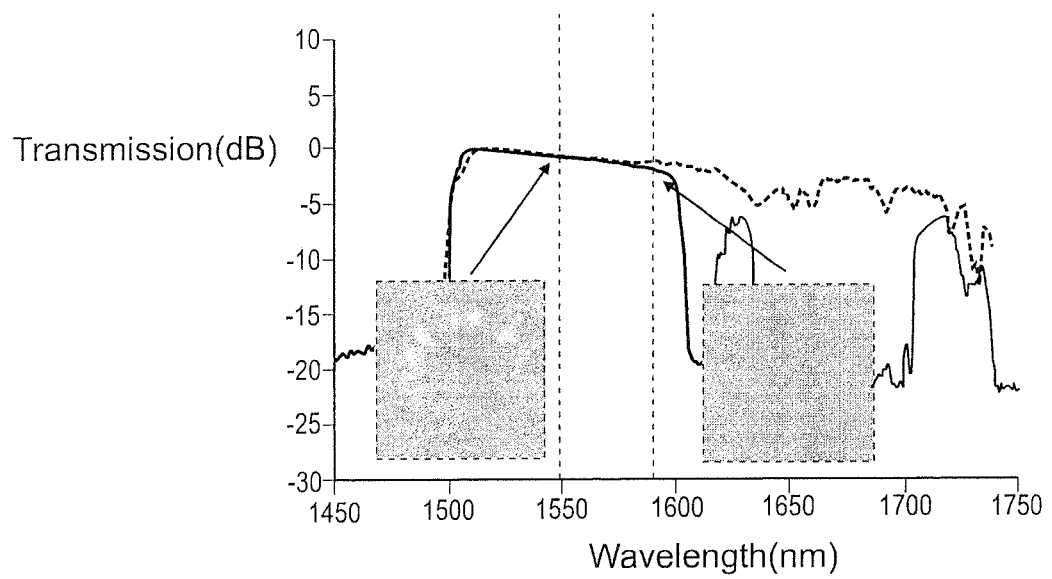
FIGS. 7 and 8 show examples of type 1 surface modes—Pull 2.
Figure 8:
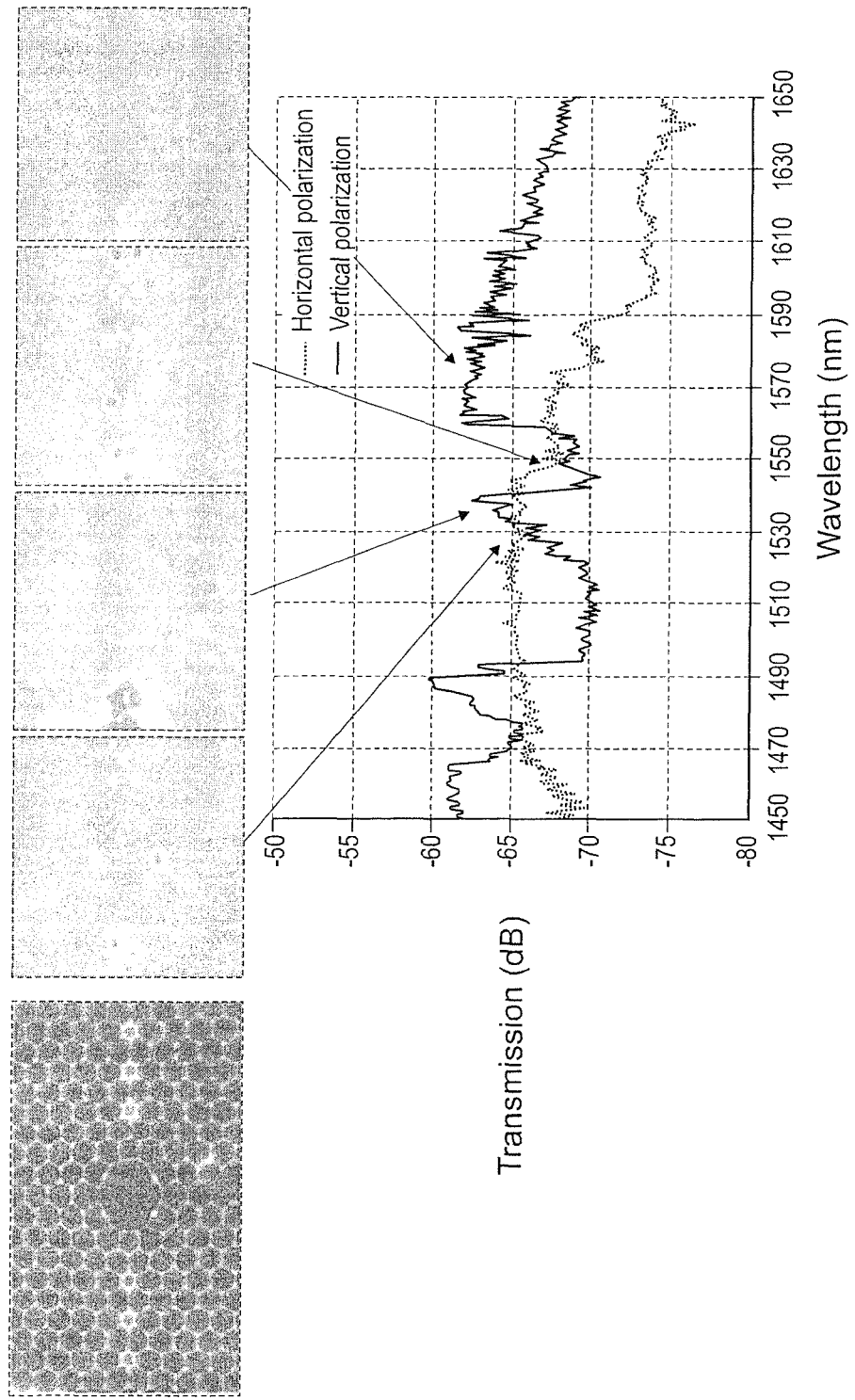
Figure 9:
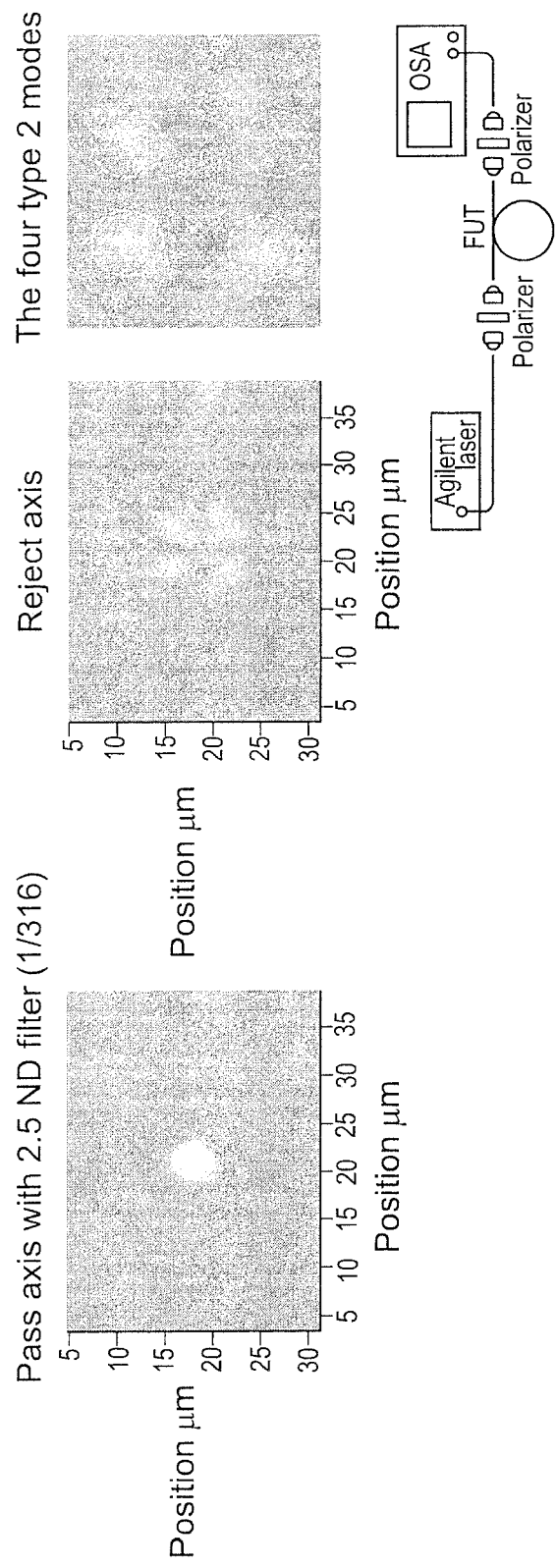
Figure 10:
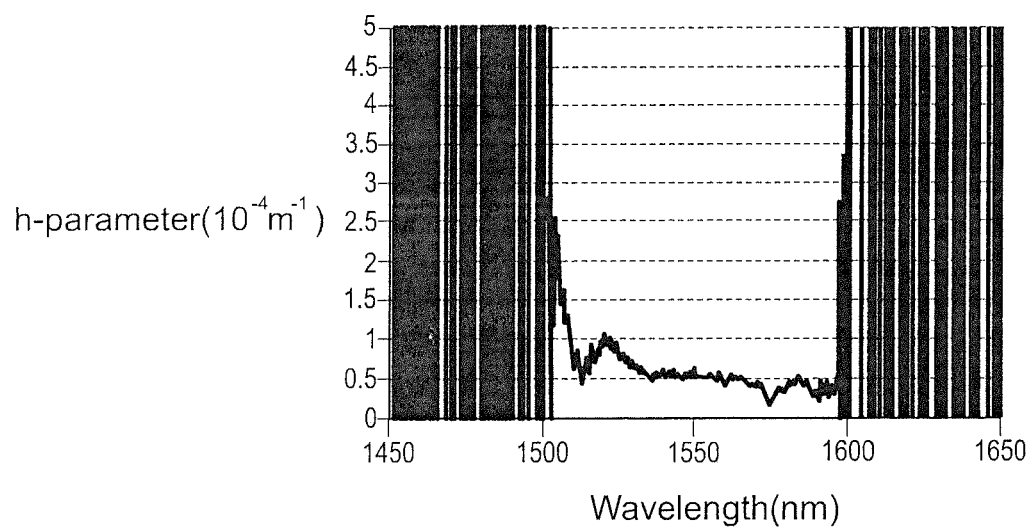
FIG. 10 shows an example of PM properties—Pull 2.
Figure 10:
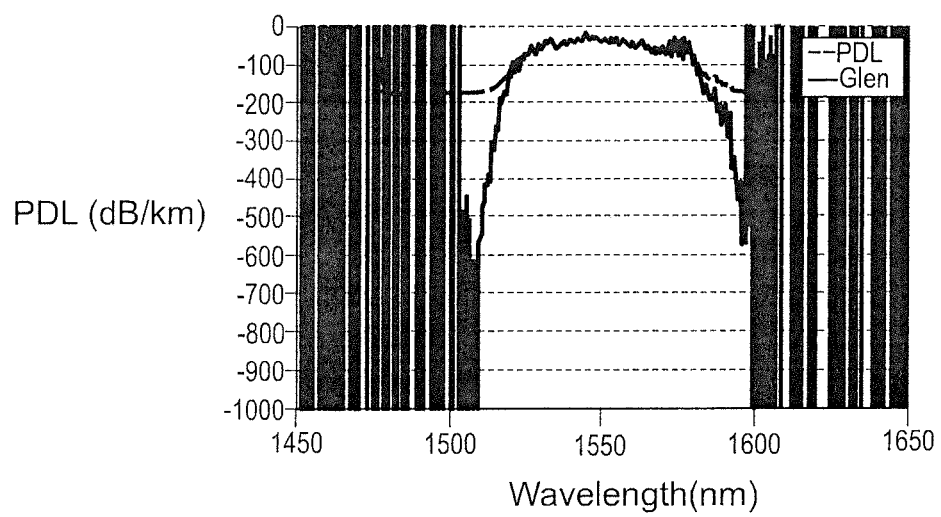

The resonators (also referred to as resonant features) may be seen as perturbations to a uniform two-dimensional lattice structure of the cladding (two-dimensional refer to a cross-section of the fiber perpendicular to the longitudinal axis of the fiber). For example, FIG. 1 illustrates a hollow core fiber comprising a cladding structure with a hexagonal lattice of holes (also known as close-packed structure). The holes have a pitch (also known as lattice spacing or center-to-center spacing). The resonators or perturbations in the cladding structure are seen in FIG. 1 as holes of smaller diameter than the holes of a uniform lattice. In FIG. 1, the holes of smaller diameter are placed along a line on both sides of the core (i.e. linear orientation in the vertical orientation). As example of producing a fiber with such cladding resonators, the holes can be made smaller during production by stacking capillary tubes holes of smaller inner and/or outer diameter than tubes for the remainder of the cladding. Another example of production, is by applying a different pressure to certain holes than the remainder of holes in the cladding, whereby said certain holes can be made larger or smaller than the remainder of cladding holes. Typically, the remainder of holes represent a majority of holes in the cladding and thereby form the lattice structure (or the uniform parts of the lattice structure).

FIGS. 1A-3A show transverse cross sections of fibers 1 according to the invention. An outer cladding 5 surrounds a lattice structure of holes constituting the (inner) cladding 3 which in turn surround the core 2. For all fibers 1 resonant structures are laid out along a straight line extending from the core 2 to the outer cladding 5. FIGS. 1B-3B show the corresponding fibers under a higher magnification.

In FIG. 1, the resonator features are holes that are smaller than the majority of holes. The smaller resonator holes, typically also deform their immediate surroundings (the lower pressure applied to the resonator holes compared to the majority of holes, cause some enlargement of the immediately surrounding holes). In one embodiment the immediately surrounding holes contribute to the reduction of surface mode and are therefore considered part of the perturbation region. In another embodiment, they do not and are therefore not considered part of the perturbation region. The resonators in FIG. 1 have a dimension of less than the pitch (as seen the resonators or perturbations results from holes of smaller dimensions that the majority of holes in the cladding). Similarly, FIG. 3 shows resonant features with dimensions larger than the pitch (as seen the resonators or perturbations results from holes of larger dimensions that the majority of holes in the cladding). A dimension of the resonator features in FIG. 3 are around 1.8 times the pitch.

In one embodiment, the resonant features are passive and the suppression of surface modes is done by a light leaking mechanism. I.e., light in a surface mode is coupled to one or more resonator(s) and these resonators are leaky (meaning non-guiding).

In one embodiment, the resonant features comprise doped material, such that the suppression of surface modes is done by a light absorbing mechanism. I.e., light in a surface mode is coupled to one or more resonator(s) and these resonators are absorbing the light.

In one embodiment, the hollow core fiber is configured to support only a fundamental mode in the hollow core at a signal wavelength, and resonant features in the cladding are configured to couple light resonantly with surface modes of the fiber at the signal wavelength.

In one embodiment, said signal wavelength is in the range of 200 nm to 10 μm.

In one embodiment, said signal wavelength is around 1.5 μm, such as in the range from 1540 to 1560 nm.

In one embodiment, said pitch is around 3 μm, such as in the range from 2.5 μm to 3.5 μm.

In one embodiment, said core region has a dimension of around 10 μm. The core may have a circular or near-circular shape, and the dimension is identical to the diameter core. The core may have an elliptical or near-elliptical, shape and the dimension is identical to the major axis of the core hole.

In one embodiment, said resonators are positioned linearly in the cladding. This positioning is preferred in order to increase leakage losses of surface modes and thereby to increase suppression.

In one embodiment, said resonators comprises doped material such as Er, Ce, Yb or other dopants that may absorb light a desired signal wavelength.

Typical signal wavelengths are around 800 nm, around 1.0 μm, around 1.3 μm, around 1.5 μm, around 2 μm, around 3.5 μm, and around 3.9 μm.

In one embodiment, said core region has a geometry that introduced form birefringence to the optical fiber. This is preferred in order to have a polarization preserving fiber, or alternatively a polarizing fiber.

In one embodiment, said optical fiber has a birefringence characterized by an h-parameter of less than $10^{-4}$. This has the advantage of rending the fiber polarization maintaining, as desired in a number of applications such as fiber gyroscopes, lasers, optical communications, and others.

In one embodiment the optical fiber is a polarization maintaining hollow core fiber.

The present invention further covers methods of producing hollow core fibers with relatively small cladding features for reducing or eliminating surface modes.

The present invention is not limited to specific hollow core fiber designs, but may be utilized in general to produce any kind of optical fibers comprising one or more voids. The various preferred embodiments and improvements may be used independently or in any combination.

In one embodiment the fiber according to the invention is applicable to one or more of the following applications: transmission systems, gyroscopes, and sensors in general, gas lasers, and lasers and amplifiers in general, pulse compression, dispersion compensation, but it is not limited to such uses.

Some embodiments have been shown in the foregoing, but it should be stressed that the invention is not limited to these, but may be embodied in other ways within the subject-matter defined in the following claims. Various modifications and applications may occur to those skilled in the art without departing from the true spirit and scope of the invention as defined in the appended claims.

The invention claimed is:

1. A hollow core optical fiber comprising:
   a core region having a longitudinal axis,
   a cladding region surrounding said core region, said core and cladding regions forming a care-cladding interface supporting at least one surface mode,
   said core and cladding regions configured to support and guide the propagation of light in one or more transverse modes of said core region in the direction of said axis,
   said cladding region including an inner cladding region, the cross-section of said inner cladding region perpendicular to said axis having a periodic spatial variation of its refractive index configured to guide said light by bandgap confinement,
   said inner cladding region including at least one perturbation region that perturbs the periodicity of said index therein, said at least one perturbation region being configured to resonantly couple said at least one surface mode to at least one transverse mode of said perturbation region, and
   said perturbation region being configured to suppress at least said surface mode; wherein:
   said periodic spatial variation having a representative pitch, L,
   said inner cladding region comprising a majority of holes having diameter d1 and a number of second holes of diameter d2,
   wherein d1 and d2 are different,
   and d2 is in the range of 2.5 times L to 0.05 times L,
   and said number of first holes is larger than said number of second holes,
   and said number of second holes is larger than 3.

2. A hollow core optical fiber according to claim 1, wherein said core and cladding regions are configured to support and guide the propagation of light in only one transverse mode of said core region in the direction of said axis.

3. A hollow core optical fiber according to claim 1, wherein said resonators are formed by partly collapsed holes in the cladding.

4. A hollow core optical fiber according to claim 1, wherein said resonators are formed by increased holes in the cladding.

5. A hollow core optical fiber according to claim 1, wherein said resonators are formed by partly collapsed and from increased holes in the cladding.

6. A hollow core optical fiber according to claim 1, wherein one or more of the resonators comprises doped silica.

7. A hollow core optical fiber according to claim 1, wherein the number of the resonators are larger than 2, such as larger than 4, such as larger than 8.

8. A hollow core optical fiber according to claim 6, wherein the number of the resonators is smaller than 100, such as smaller than 20, such as smaller than 10.

9. A hollow core optical fiber according to claim 1, wherein resonators are positioned substantially in radial direction(s) from the core.

10. A hollow core optical fiber according to claim 1, wherein resonators are positioned substantially symmetric around the core 11. A method of producing a hollow core optical fiber, wherein the method comprises the steps of:
    stacking capillary tubes in a configuration to form a preform for a hollow core optical fiber,
    drawing said preform in one or more steps to a hollow core optical fiber,
    during drawing apply a first pressure to a core region, and a second pressure to a majority of holes in a cladding region giving a hole diameter d1, and apply a third pressure to certain holes in a cladding region giving a hole diameter d2,
    whereby dimensions, d2, of said certain holes are controlled during drawing, such that said certain holes differ in size from a majority of cladding holes in said hollow core fiber, and thereby form cladding resonators that suppress surface modes in said hollow core fiber.

12. A method of applying a hollow core optical fiber to a device, the method comprising utilizing the hollow core optical fiber of claim 1 in one of an optical fiber gyroscope, an optical communication system, a laser, and a sensor.

13. A method of applying a hollow core optical fiber to a device, the method comprising utilizing the hollow core optical fiber produced in the method of claim 11 in one of an optical fiber gyroscope, an optical communication system, a laser, and a sensor.

* * * * *